United States Patent
Akebono (10) Patent No.: US 9,028,356 B2
(45) Date of Patent: May 12, 2015

(54) DEVICE FOR CONTROLLING AUTOMATIC TRANSMISSION AND METHOD FOR CONTROLLING SAME

(71) Applicants: Jatco Ltd, Fuji-shi, Shizuoka (JP); Nissan Motor Co., Ltd., Yokohama-shi, Kanagawa (JP)

(72) Inventor: Hiromichi Akebono, Phoenix, AZ (US)

(73) Assignees: Jatco Ltd, Fuji-Shi (JP); Nissan Motor Co., Ltd., Yokohama-Shi (JP)

( * ) Notice: Subject to any disclaimer, the term of this patent is extended or adjusted under 35 U.S.C. 154(b) by 0 days.

(21) Appl. No.: 14/359,026

(22) PCT Filed: Oct. 4, 2012

(86) PCT No.: PCT/JP2012/075820
§ 371 (c)(1),
(2) Date: May 16, 2014

(87) PCT Pub. No.: WO2013/073309
PCT Pub. Date: May 23, 2013

(65) Prior Publication Data
US 2014/0349816 A1    Nov. 27, 2014

(30) Foreign Application Priority Data
Nov. 18, 2011    (JP) ................. 2011-253169

(51) Int. Cl.
*F16H 31/00*    (2006.01)
*B60W 10/11*    (2012.01)
*F16H 61/12*    (2010.01)
(Continued)

(52) U.S. Cl.
CPC ............ *B60W 10/11* (2013.01); *F16H 59/44* (2013.01); *F16H 61/12* (2013.01); *F16H 2061/1208* (2013.01); *F16H 2061/1276* (2013.01); *F16H 2059/446* (2013.01); *B60W 10/06* (2013.01)

(58) Field of Classification Search
USPC ......................................... 475/131
See application file for complete search history.

(56) References Cited

U.S. PATENT DOCUMENTS 4,891,758 A * 1/1990 Simonyi et al. ............. 701/62
5,655,993 A   8/1997 Fujimoto et al.
(Continued)

FOREIGN PATENT DOCUMENTS

EP    1178245 A1 * 2/2002 ............. F16H 61/12
JP    05-322027 A   12/1993
(Continued)

*Primary Examiner* — Dirk Wright
(74) *Attorney, Agent, or Firm* — Foley & Lardner LLP (57) ABSTRACT

A device for controlling an automatic transmission includes: a position detection means for detecting a shift position; a vehicle speed detection means for detecting a vehicle speed; a rotation frequency detection means for detecting an input rotation frequency of the automatic transmission; and a control means for, when the shift position has been switched from a parking position or a neutral position to a driving position, making a determination about switching from stopped-state control to running-state control based on the vehicle speed after a physical amount indicating a state of the automatic transmission becomes equal to or larger than a predetermined value, the stopped-state control being control for a hydraulic pressure supplied to engaging elements based on the input rotation frequency of the automatic transmission, and the running-state control being control for the hydraulic pressure supplied to the engaging elements without using the input rotation frequency of the automatic transmission.

7 Claims, 7 Drawing Sheets

(51) Int. Cl.
    *B60W 10/06*     (2006.01)
    *F16H 59/44*     (2006.01)

(56) References Cited

U.S. PATENT DOCUMENTS

| | | | |
|---|---|---|---|
| 6,616,571 B2 * | 9/2003 | Kigoshi | 477/36 |
| 6,716,127 B2 * | 4/2004 | Takatori et al. | 475/131 |
| 7,463,952 B2 * | 12/2008 | Bidou et al. | 701/1 |
| 8,386,132 B2 * | 2/2013 | Marlett et al. | 701/48 |
| 2003/0078129 A1 | 4/2003 | Takatori et al. | |
| 2004/0117082 A1 * | 6/2004 | Bidou et al. | 701/33 |

FOREIGN PATENT DOCUMENTS

| | | | |
|---|---|---|---|
| JP | 09-004706 A | 1/1997 | |
| JP | 2003-097688 A | 4/2003 | |
| WO | WO 2010110057 A1 * | 9/2010 | F16H 63/48 |
| WO | WO 2012111066 A1 * | 8/2012 | |

* cited by examiner

FIG. 7

DEVICE FOR CONTROLLING AUTOMATIC TRANSMISSION AND METHOD FOR CONTROLLING SAME

TECHNICAL FIELD

The present invention relates to a device for controlling an automatic transmission and a method for controlling the same.

BACKGROUND ART

JP-A-5-322027 discloses a conventional technique to, when a shift lever has been switched from an N range to a D range or an R range, determine a target rate of change in the turbine rotational speed based on the engine rotational speed, and decrease the turbine rotational speed to conform to the target rate of change in the turbine rotational speed.

On the other hand, JP-A-2003-97688 discloses a technique to, when a shift lever has been switched from a D range to an N range and then returned to the D range while a vehicle is running, change a filtering process for an electric current supplied to a solenoid in accordance with the shift lever operation.

SUMMARY OF INVENTION

It is considered that, in the aforementioned inventions, control compliant with a shift lever operation is started or ended based on the vehicle speed. The vehicle speed is detected based on a signal from a vehicle speed sensor that detects rotation of an output shaft of a transmission.

A vehicle has a parking mechanism of mechanically fixing the output shaft at the time of parking. When a shift lever is switched to a P range, the parking mechanism fixes the output shaft so that the vehicle does not move. Typically, the parking mechanism is actuated by switching the shift lever to the P range when the vehicle is in a stopped state with the shift lever situated in a driving range. At this time, the engine is transmitting power to the output shaft. Nevertheless, as wheels are forcibly stopped by a foot brake, the output shaft is subjected to torsion. In some cases, the parking mechanism fixes the output shaft without eliminating the torsion of the output shaft. The torsion of the output shaft is eliminated when the shift lever is switched from the P range to a range other than the P range. However, upon elimination of the torsion, the output shaft rotates, and the vehicle speed sensor outputs a signal. This could possibly lead to a situation where, even though the vehicle is stopped, the vehicle is erroneously determined to be running, and control that is performed when the vehicle is running is started.

The present invention has been conceived to solve the above problem. It is an object of the present invention to suppress the occurrence of a situation where, when a shift lever has been changed from a non-driving range to a driving range, a vehicle is erroneously determined to be running even though the vehicle is stopped, and control that is performed while the vehicle is running is executed.

A device for controlling an automatic transmission according to one aspect of the present invention includes: a position detection means for detecting a position of a shift lever; a vehicle speed detection means for detecting a vehicle speed; a rotation frequency detection means for detecting an input rotation frequency of the automatic transmission; and a control means for, when the shift lever has been switched from a parking position or a neutral position to a driving position, making a determination about switching from stopped-state control to running-state control based on the vehicle speed after a physical amount indicating a state of the automatic transmission becomes equal to or larger than a predetermined value, the stopped-state control being control for a hydraulic pressure supplied to engaging elements based on the input rotation frequency of the automatic transmission, and the running-state control being control for the hydraulic pressure supplied to the engaging elements without using the input rotation frequency of the automatic transmission.

With a method for controlling an automatic transmission according to another aspect of the present invention, when a shift lever has been switched from a parking position or a neutral position to a driving position, a determination about switching from stopped-state control to running-state control is made based on a vehicle speed after a physical amount indicating a state of the automatic transmission becomes equal to or larger than a predetermined value, the stopped-state control being control for a hydraulic pressure supplied to engaging elements based on an input rotation frequency of the automatic transmission, and the running-state control being control for the hydraulic pressure supplied to the engaging elements without using the input rotation frequency of the automatic transmission.

According to the above aspects, when the shift lever has been changed from the parking position or the neutral position to the driving position, the stopped-state control can be appropriately switched to the running-state control based on the vehicle speed.

Embodiments and advantages of the present invention will be described below in detail with reference to the attached drawings.

DESCRIPTION OF EMBODIMENTS

A configuration according to a first embodiment of the present invention will now be described with reference to FIG. 1.

Figure 1:
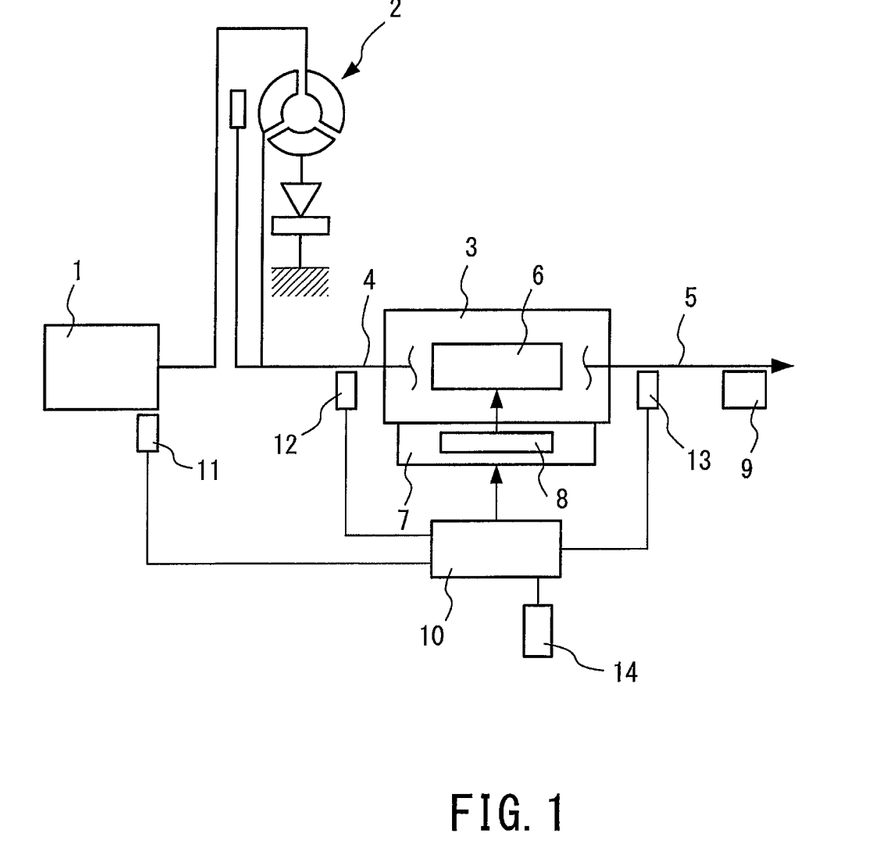
FIG. 1 is a schematic configuration diagram showing a part of a vehicle provided with an automatic transmission according to a present embodiment.

FIG. 1 is a schematic configuration diagram showing a part of a vehicle provided with an automatic transmission according to the present embodiment.

The vehicle includes an engine 1, a torque converter 2, an automatic transmission 3, a valve body 7, a parking mechanism 9, and a controller 10.

The output of the engine 1 is adjusted by a throttle valve that increases an opening degree from a fully closed state to a fully open state in coordination with an accelerator pedal operated by a driver. The output rotation of the engine 1 is input to an input shaft 4 of the automatic transmission 3 via the torque converter 2.

The automatic transmission 3 is configured such that a front planetary gear unit and a rear planetary gear unit, which are not shown, are mounted on the input shaft 4 and an output shaft 5 that are coaxially arranged. The automatic transmission 3 realizes a desired gear stage by switching among power transmission paths using combinations of engagement and disengagement of a plurality of engaging elements 6 that are hydraulically actuated.

When a shift lever is shifted to a P range, the output shaft 5 is locked by the parking mechanism 9 so that the output shaft 5 cannot rotate.

Hydraulic passages (not shown) for supplying a hydraulic pressure to the engaging elements 6 are formed in the valve body 7. A solenoid 8, which is driven based on an instruction input from the controller 10, is controlled to supply a hydraulic pressure compliant with an instruction pressure set by the controller 10 to predetermined engaging elements 6 by operating pressure regulating valves (not shown) provided to the hydraulic passages. Also, when the vehicle is running, the solenoid 8 is controlled to supply a hydraulic pressure only to engaging elements 6 that are necessary for achieving a desired transmission gear ratio.

The controller 10 determines an instruction pressure for an actuating hydraulic pressure supplied to engaging elements 6 to be engaged based on the output from an engine rotation sensor 11, a turbine rotation sensor 12, an output shaft rotation sensor 13, an inhibitor switch 14, and the like. The controller 10 then outputs an instruction for driving the solenoid 8 to supply the actuating hydraulic pressure compliant with the determined instruction pressure to the engaging elements 6. The controller 10 is constituted by a CPU, ROM, RAM, and the like. Each function is implemented by the CPU executing a program stored in the ROM.

The engine rotation sensor 11 detects rotation of an output shaft of the engine 1, and outputs a signal indicative of the detected rotational speed of the output shaft (engine rotational speed Ne) to the controller 10. The turbine rotation sensor 12 detects rotation of the input shaft 4 of the automatic transmission 3, and outputs a signal indicative of a rotational speed of the input shaft 4 (turbine rotational speed Nt) to the controller 10. The output shaft rotation sensor 13 detects rotation of the output shaft 5 of the automatic transmission 3, and outputs a signal indicative of a rotational speed of the output shaft 5 (output shaft rotational speed No) to the controller 10. The output shaft rotational speed No detected by the output shaft rotation sensor 13 is used as a vehicle speed. The inhibitor switch 14 is mounted on a manual shaft (not shown) that turns in coordination with a shift lever operation, and outputs a signal indicative of a range selected by the shift lever to the controller 10.

In order to make the engaging elements 6 engaged, the controller 10 performs a piston stroke phase, an engagement progress phase, and a final engagement phase in this order. As a result, the engaging elements 6 are engaged. In the piston stroke phase, filling of a hydraulic circuit and piston strokes of the engaging elements 6 are completed by maintaining a low instruction pressure after issuing an instruction for a high instruction pressure. In the engagement progress phase, the instruction pressure is increased from the instruction pressure of the piston stroke phase at a predetermined increase rate. In the final engagement phase following the engagement progress phase, the instruction pressure is increased, in a short amount of time, to the maximum value corresponding to clutch engagement. When the engagement progress phase has been ended, the engaging elements 6 are in an engaged state.

When the shift lever has been changed from a non-driving range to a driving range, the controller 10 causes the engaging elements 6 to be engaged using normal control and open mode control. A non-driving range denotes a P range and an N range. A driving range denotes a D range (including an L range and the like) and an R range.

Normal control denotes control for engagement of the engaging elements 6 based on signals from the engine rotation sensor 11, the turbine rotation sensor 12, the output shaft rotation sensor 13, and the like. The normal control is performed when the vehicle is stopped. In the normal control, a hydraulic pressure supplied to the engaging elements 6 is controlled based on a degree of progress indicated by expression (1).

$$\text{Degree of progress}(\%)=(Ne-Nt)/(Ne-No\times\text{gear ratio})\times 100 \qquad (1)$$

When the vehicle is stopped with the engaging elements 6 being disengaged, the engine rotational speed Ne is substantially equal to the turbine rotational speed Nt, and therefore the degree of progress is substantially 0%. When the vehicle is stopped with the engaging elements 6 being completely engaged, the turbine rotational speed Nt is equal to a value of the product of the output shaft rotational speed No and the gear ratio of the automatic transmission 3, and therefore the degree of progress is 100%.

When the vehicle is in a running state, if the shift lever is, for example, changed from the D range to the N range and then returned to the D range, the value of the degree of progress could possibly become substantially constant regardless of the state of engagement of the engaging elements 6. This creates difficulty in accurately detecting the state of the engaging elements 6 based on the degree of progress. For this reason, while the vehicle is running, the engaging elements 6 are engaged through the open mode control.

Open mode control denotes control for engagement of the engaging elements 6 in accordance with the elapse of a time period of a timer provided to the controller 10.

It should be noted that, according to the present embodiment, in the piston stroke phase, the normal control is performed whether the vehicle is running or stopped. A specific description will be provided later.

Figure 2:
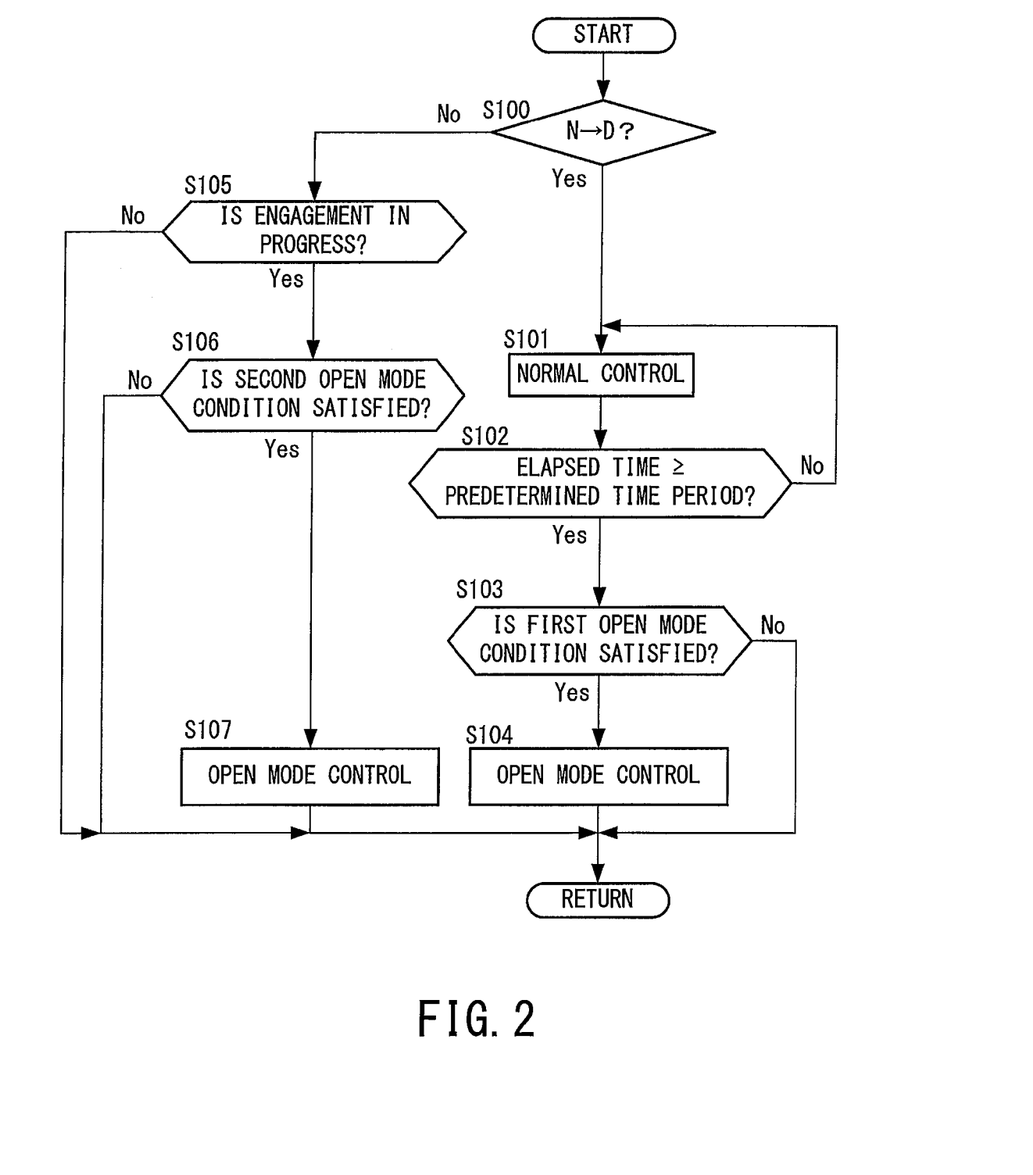
FIG. 2 is a flowchart showing control for the case where a shift lever has been changed from a non-driving range to a driving range in a first embodiment.

Next, a description is given of control for the case where the shift lever has been changed from a non-driving range to a driving range with reference to a flowchart of FIG. 2. As one example, the following describes the case where the non-driving range and the driving range are the N range and the D range, respectively.

In step S100, the controller 10 determines whether or not the shift lever has been changed from the N range to the D range based on a signal from the inhibitor switch 14. When the shift lever has been changed from the N range to the D range, the controller 10 causes the timer to start measuring a time period that has elapsed since the shift lever was changed from the N range to the D range, and proceeds to step S101. When the shift lever has not been changed from the N range to the D range, that is to say, when the shift lever had already been changed to the D range earlier or when the D range is not selected, the controller 10 proceeds to step S105.

In step S101, the controller 10 supplies a hydraulic pressure to the engaging elements 6 through the normal control.

In step S102, the controller 10 determines whether or not the elapsed time period, which is a physical amount indicating the state of the automatic transmission 3, has become equal to a predetermined time period (a first predetermined time period). The predetermined time period is set in advance by way of experiments and the like in consideration of variations in individual vehicles, so that the predetermined time period does not exceed a time period from when the shift lever is changed from the N range to the D range to when the piston strokes of the engaging elements 6 that are engaged when the vehicle moves are completed, that is to say, when the piston stroke phase is ended. When the elapsed time period has become equal to the predetermined time period, the controller 10 proceeds to step S103. When the elapsed time period has not become equal to the predetermined time period, the controller 10 returns to step S101 and repeats the above-described control.

Even if the output shaft 5 is subjected to torsion when the vehicle is stopped, the torsion of the output shaft 5 will be eliminated by the time the predetermined time period has elapsed. That is to say, the elapsed time period is also a physical amount indicating whether or not the torsion of the output shaft 5 has been eliminated.

In step S103, the controller 10 determines whether or not a first open mode control condition is satisfied. The controller 10 determines that the first open mode control condition is satisfied when the degree of progress is equal to or larger than a first threshold value. The controller 10 proceeds to step S104 when the first open mode control condition is satisfied, and continues the normal control when the first open mode control condition is not satisfied. The first threshold value is a value with which the vehicle is determined to be running. In the case where the vehicle is stopped, immediately after the piston stroke phase is ended, there is substantially no difference between the engine rotational speed Ne and the turbine rotational speed Nt, and therefore the degree of progress is substantially zero. On the other hand, in the case where the vehicle is running, immediately after the piston stroke phase is ended, the engine rotational speed Ne may be different from the turbine rotational speed Nt, and therefore the degree of progress may not be substantially zero. In view of this, the controller 10 determines that the vehicle is running when the degree of progress is equal to or larger than the first threshold value.

In step S104, the controller 10 switches from the normal control to the open mode control.

In step S105, the controller 10 determines whether or not the engagement of the engaging elements 6 is in progress. When the engagement of the engaging elements 6 is in progress, the controller 10 proceeds to step S106. When the engagement of the engaging elements 6 is not in progress, that is to say, when control for engagement of the engaging elements 6 through the normal control or the open mode control has been ended or when the engaging elements 6 are not engaged due to non-selection of the D range, the controller 10 ends the present control.

In step S106, the controller 10 determines whether or not a second open mode control condition is satisfied. The controller 10 determines that the second open mode control condition is satisfied when the state of engagement of the engaging elements 6 is not the final engagement phase and (Ne−No×the gear ratio of the automatic transmission 3) is equal to or smaller than a second threshold value. The controller 10 proceeds to step S107 when the second open mode control condition is satisfied, and continues the present control when the second open mode control condition is not satisfied. The second threshold value is a value with which the vehicle is determined to be running. In the case where the vehicle is running, the output shaft rotational speed No is not zero, and therefore the value of (Ne−No×the gear ratio of the automatic transmission 3) becomes small compared to the case where the vehicle is stopped. In view of this, the controller 10 determines that the vehicle is running when (Ne−No×the gear ratio of the automatic transmission 3) is equal to or smaller than the second threshold value. It should be noted that, in the final engagement phase, the engaging elements 6 are in an engaged state, and therefore the controller 10 does not proceed to step S107 even when the normal control is being performed.

In step S107, if the normal control is being performed, the controller 10 switches to the open mode control.

Figure 3:
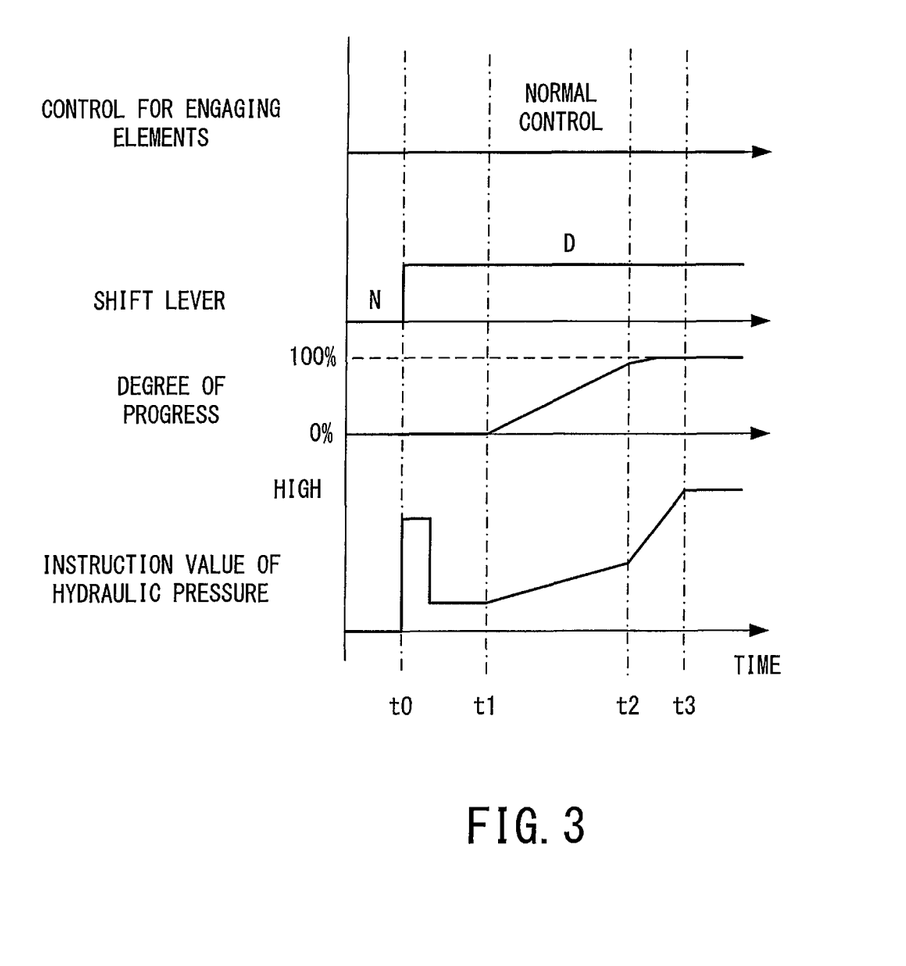
FIG. 3 is a time chart for the case where the shift lever has been changed from an N range to a D range when a vehicle is in a stopped state.
Figure 4:
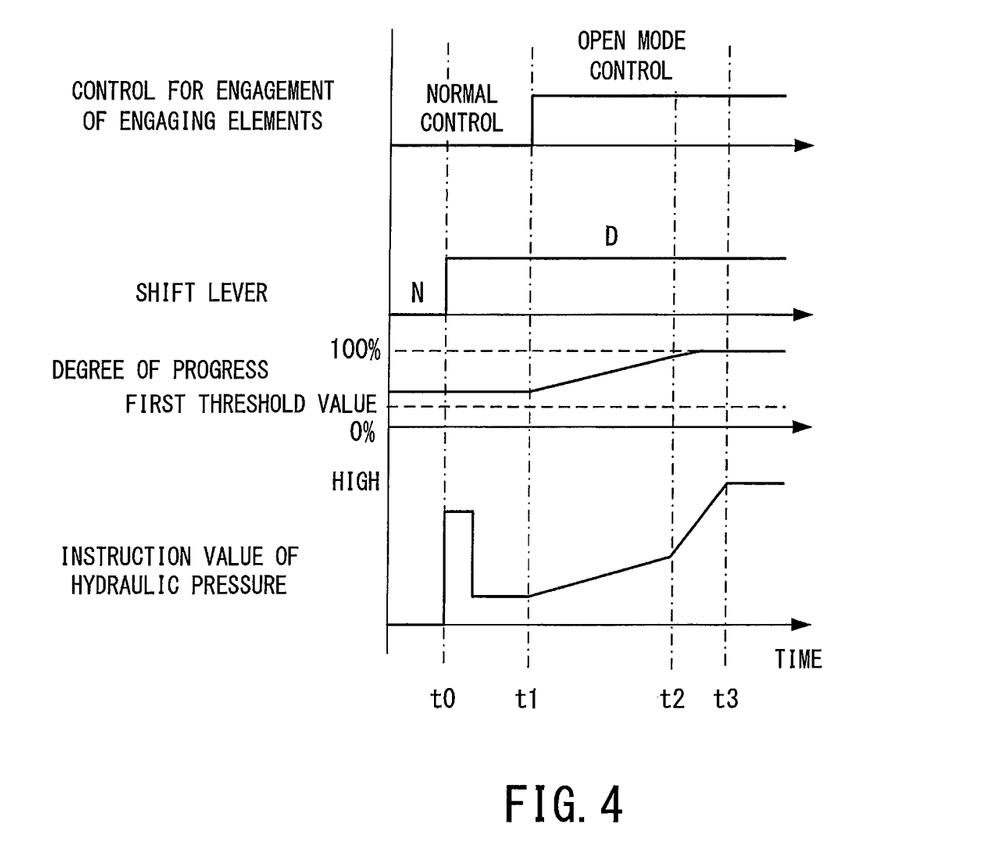
FIG. 4 is a time chart for the case where the shift lever has been changed from the D range to the N range and then returned from the N range to the D range while the vehicle is running.

The following describes the control for the case where the shift lever has been changed from the N range to the D range with reference to time charts of FIGS. 3 and 4.

First, the description is given with reference to FIG. 3. FIG. 3 is a time chart for the case where the shift lever has been changed from the N range to the D range when the vehicle is in a stopped state.

When the shift lever is changed from the N range to the D range at time t0, the piston stroke phase is started. Here, control for engagement of the engaging elements 6 is performed through the normal control.

At time t1, the piston stroke phase is ended, and the engagement progress phase is started. Here, the degree of progress is 0%, and the normal control is continued. As the instruction value of the hydraulic pressure increases, the engaging elements 6 are gradually engaged, and the degree of progress increases.

At time t2, the engagement progress phase is ended, and the engagement ending phase is started.

When the instruction hydraulic pressure reaches the maximum value for the engaging elements 6 at time t3, the engagement ending phase is ended, and control for engagement of the engaging elements 6 is ended.

Next, the description is given with reference to FIG. 4. FIG. 4 is a time chart for the case where the shift lever has been changed from the D range to the N range and then returned from the N range to the D range while the vehicle is running. It should be noted that the time chart of FIG. 4 depicts a stage following the change in the shift lever from the D range to the N range.

When the shift lever is changed from the N range to the D range at time t0, the piston stroke phase is started. Here, although the degree of progress is not 0%, the normal control is performed.

At time t1, the piston stroke phase is ended, and the engagement progress phase is started. As the degree of progress is equal to or larger than the first threshold value, control for engagement of the engaging elements 6 is changed from the normal control to the open mode control.

At time t2, the engagement progress phase is ended, and the engagement ending phase is started.

When the instruction hydraulic pressure reaches the maximum value for the engaging elements 6 at time t3, the engagement ending phase is ended, and control for engagement of the engaging elements 6 is ended.

The effects of the first embodiment of the present invention are as follows.

In the present embodiment, when the shift lever has been changed from the N range to the D range, whether or not to switch from the normal control to the open mode control is determined after the timer indicates that a predetermined time period has elapsed since the change from the N range to the D range.

Without the application of the present embodiment, when the vehicle is stopped with the output shaft being subjected to torsion, a signal that is output from the vehicle speed sensor upon elimination of the torsion of the output shaft could possibly lead to a situation where the vehicle is erroneously determined to be running, even though the vehicle is actually not running. This could possibly cause the engaging elements to be engaged through the open mode control.

On the other hand, with the application of the present embodiment, even if the torsion has occurred, the determination is made after the elapse of a predetermined time period over which the torsion is eliminated. This makes it possible to prevent the foregoing erroneous determination, and suppress the open mode control from being performed while the vehicle is stopped.

A description is now given of a second embodiment of the present invention.

The present embodiment differs from the first embodiment in control for the case where the shift lever has been changed from a non-driving range to a driving range. The following describes control for the case where the shift lever has been changed from a non-driving range to a driving range in the present embodiment with reference to a flowchart of FIG. 5.

Figure 5:
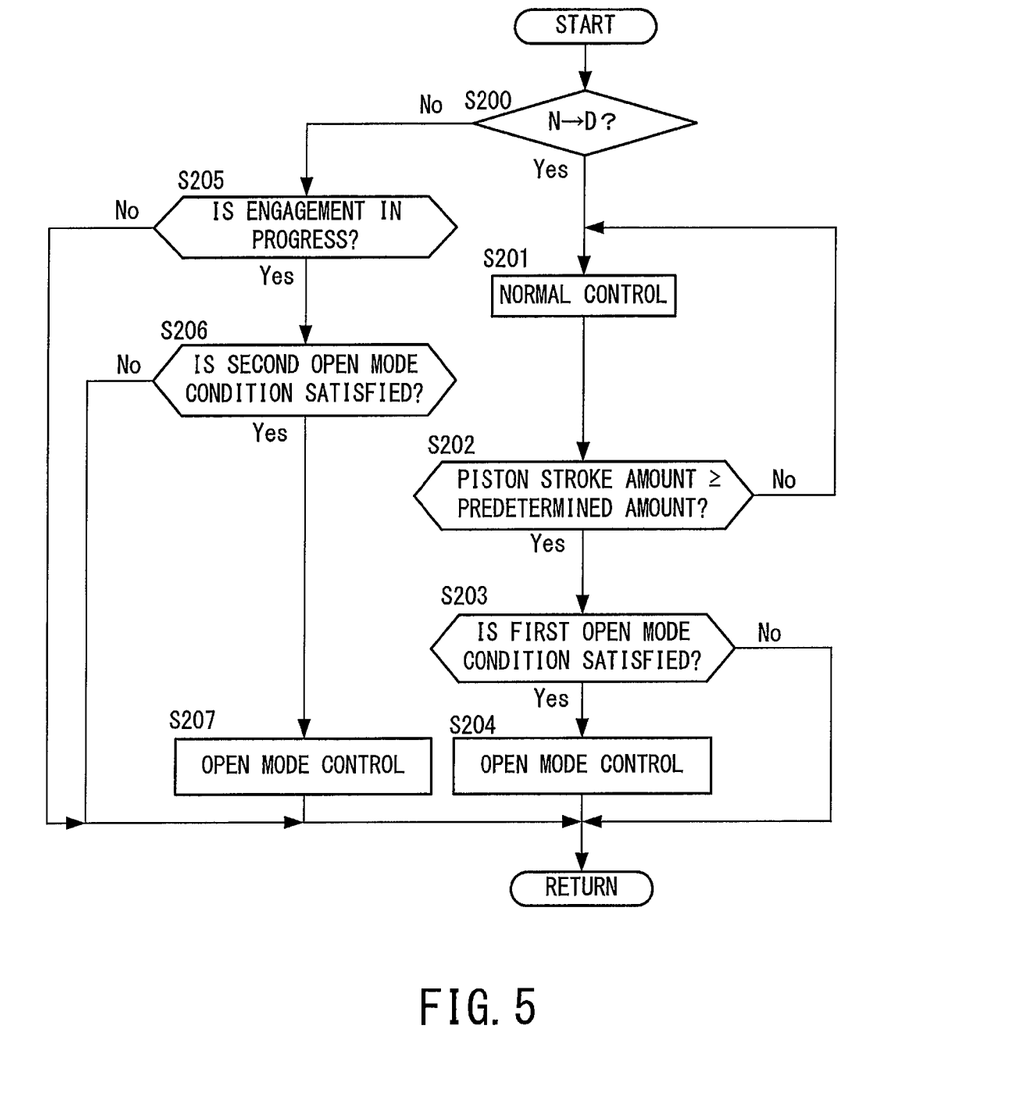
FIG. 5 is a flowchart showing control for the case where a shift lever has been changed from a non-driving range to a driving range in a second embodiment.

In step S200, the controller 10 determines whether or not the shift lever has been changed from the N range to the D range based on a signal from the inhibitor switch 14. When the shift lever has been changed from the N range to the D range, the controller 10 proceeds to step S201. When the shift lever has not been changed from the N range to the D range, the controller 10 proceeds to step S205.

In step S201, the controller 10 supplies a hydraulic pressure to the engaging elements 6 through the normal control.

In step S202, the controller 10 calculates a piston stoke amount of the engaging elements 6, which is a physical amount indicating the state of the automatic transmission 3, and determines whether or not the piston stroke amount is equal to or larger than a predetermined amount. The piston stroke amount is calculated based on a map showing an instruction hydraulic pressure for the engaging elements 6 and a piston stroke speed, which is determined in advance by way of experiments and the like. The piston stroke speed increases as the instruction hydraulic pressure increases. The piston stroke amount is calculated by summing the piston stroke speeds corresponding to the instruction hydraulic pressures in cycles of determination in step S202. The predetermined amount is an amount with which the piston strokes can be determined to be completed. When the piston stroke amount has become equal to or larger than the predetermined amount, the controller 10 proceeds to step S203. When the piston stroke amount has not reached the predetermined amount, the controller 10 returns to step S201 and repeats the above-described control.

Control from step S203 onward is the same as control of step S103 according to the first embodiment, and thus a description thereof is omitted.

It should be noted that the piston stroke amount may be calculated using a stroke sensor and the like.

The effects of the second embodiment of the present invention are as follows.

By determining whether or not to switch from the normal control to the open mode control based on the piston stroke amount, the normal control can be switched to the open mode control appropriately when the vehicle is running after the completion of the piston strokes, i.e., a common control method.

A description is now given of a third embodiment of the present invention.

The present embodiment differs from the first embodiment in control for the case where the shift lever has been changed from a non-driving range to a driving range. The following describes control for the case where the shift lever has been changed from a non-driving range to a driving range in the present embodiment with reference to a flowchart of FIG. 6.

Figure 6:
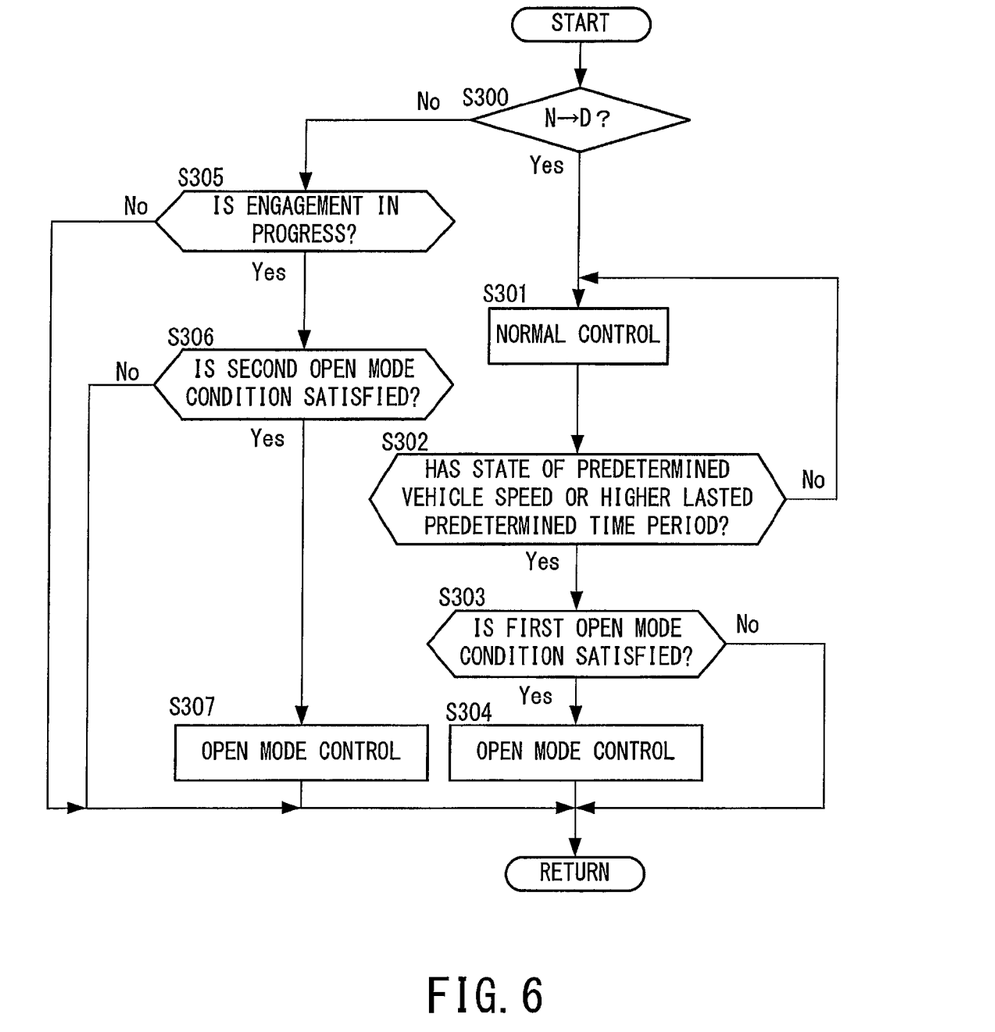
FIG. 6 is a flowchart showing control for the case where a shift lever has been changed from a non-driving range to a driving range in a third embodiment.

In step S300, the controller 10 determines whether or not the shift lever has been changed from the N range to the D range based on a signal from the inhibitor switch 14. When the shift lever has been changed from the N range to the D range, the controller 10 causes the timer to start measuring a time period from when the shift lever was changed from the N range to the D range, and proceeds to step S301. When the shift lever has not been changed from the N range to the D range, the controller 10 proceeds to step S305.

In step S301, the controller 10 supplies a hydraulic pressure to the engaging elements 6 through the normal control.

In step S302, the controller 10 determines whether or not a state where the vehicle speed is equal to or higher than a predetermined vehicle speed has lasted a predetermined time period (a second predetermined time period) based on a signal from the output shaft rotation sensor 13 and on a value of the timer, which are physical amounts indicating the state of the automatic transmission 3. The predetermined vehicle speed is a vehicle speed with which the vehicle can be determined to be running. The predetermined time period is a time period with which the rotation of the output shaft 5 can be determined to be irrelevant to the elimination of the torsion of the output shaft 5. When the state where the vehicle speed is equal to or higher than the predetermined vehicle speed has lasted the predetermined time period, the controller 10 determines that the vehicle is running, and proceeds to step S303.

Control from step S303 onward is the same as control of step S103 according to the first embodiment, and thus a description thereof is omitted.

It should be noted that it is permissible to determine that the rotation of the output shaft 5 is irrelevant to the torsion thereof and indicates running of the vehicle when the number of signals from the vehicle speed sensor has become equal to or larger than a predetermined number.

The effects of the third embodiment of the present invention are as follows.

The normal control or the open mode control can be selected after the elapse of a time period over which the torsion of the output shaft 5 is reliably eliminated. This makes it possible to suppress the open mode control from being performed while the vehicle is stopped.

A description is now given of a fourth embodiment of the present invention.

The present embodiment differs from the first embodiment in control for the case where the shift lever has been changed from a non-driving range to a driving range. The following describes control for the case where the shift lever has been changed from a non-driving range to a driving range in the present embodiment with reference to a flowchart of FIG. 7.

Figure 7:
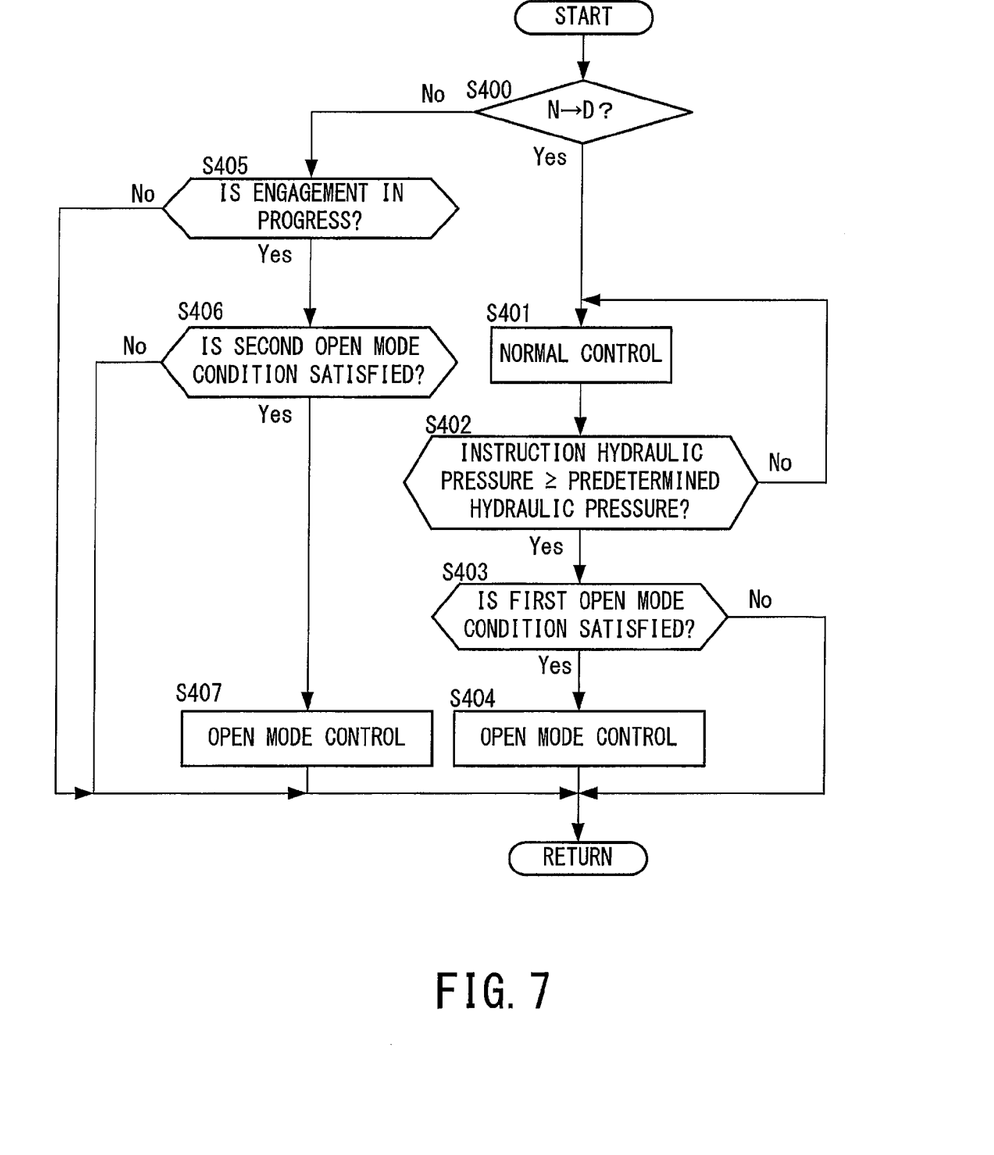
FIG. 7 is a flowchart showing control for the case where a shift lever has been changed from a non-driving range to a driving range in a fourth embodiment.

In step S400, the controller 10 determines whether or not the shift lever has been changed from the N range to the D range based on a signal from the inhibitor switch 14. When the shift lever has been changed from the N range to the D range, the controller 10 proceeds to step S401. When the shift lever has not been changed from the N range to the D range, the controller 10 proceeds to step S405.

In step S401, the controller 10 supplies a hydraulic pressure to the engaging elements 6 through the normal control.

In step S402, the controller 10 determines whether or not an instruction hydraulic pressure for the engaging elements 6, which is a physical amount indicating the state of the automatic transmission 3, is equal to or higher than a predetermined hydraulic pressure. The predetermined hydraulic pressure is a hydraulic pressure with which the piston strokes can be determined to be currently under control. When the instruction hydraulic pressure has become equal to or higher than the predetermined hydraulic pressure, the controller 10 proceeds to step S403. When the instruction hydraulic pressure is lower than the predetermined hydraulic pressure, the controller 10 returns to step S401 and repeats the above-described control.

Control from step S403 onward is the same as control of step S103 according to the first embodiment, and thus a description thereof is omitted.

While the determination is made based on the instruction hydraulic pressure in the present embodiment, a hydraulic pressure supplied to the engaging elements 6 may be detected by a hydraulic pressure sensor and the like, and the determination may be made based on the detected hydraulic pressure. Furthermore, the determination may be made based on a hydraulic pressure after a predetermined time period has elapsed since the shift lever was changed from the N range to the D range.

The effects of the fourth embodiment of the present invention are as follows.

The effects similar to those achieved in the first embodiment can be achieved also based on the instruction hydraulic pressure for the engaging elements 6.

This concludes the description of the embodiments of the present invention. It should be noted that the above-described embodiments merely illustrate a part of application examples of the present invention, and are not intended to restrict a technical scope of the present invention to specific configurations according to the above-described embodiments.

While the degree of progress is used in determining whether or not the first open mode condition is satisfied, it is permissible to switch from the normal control to the open mode control when the vehicle speed has become equal to or higher than a threshold vehicle speed.

The present application claims the benefit of priority from Japanese Patent Application No. 2011-253169, filed in the Japan Patent Office on Nov. 18, 2011, the disclosure of which is incorporated herein by reference in its entirety.

The invention claimed is:

1. A device for controlling an automatic transmission, comprising:
   a position detection unit configured to detect a shift position;
   a vehicle speed detection unit configured to detect a vehicle speed;
   a rotation frequency detection unit configured to detect an input rotation frequency of the automatic transmission; and
   a control unit configured to, when the shift position has been switched from a parking position or a neutral position to a driving position, make a determination about switching from stopped-state control to running-state control based on the vehicle speed after a physical amount indicating a state of the automatic transmission becomes equal to or larger than a predetermined value, the stopped-state control being control for a hydraulic pressure supplied to engaging elements based on the input rotation frequency of the automatic transmission, and the running-state control being control for the hydraulic pressure supplied to the engaging elements without using the input rotation frequency of the automatic transmission.

2. The device for controlling the automatic transmission according to claim 1, wherein
   the physical amount is an elapsed time period since the switching of the shift position from the parking position or the neutral position to the driving position, and
   the control unit is configured to make the determination about switching from the stopped-state control to the running-state control after the elapsed time period becomes equal to or longer than a first predetermined time period.

3. The device for controlling the automatic transmission according to claim 1, wherein
   the physical amount is a piston stroke amount of a hydraulic pressure actuator for making the engaging elements engaged, and
   the control unit is configured to make the determination about switching from the stopped-state control to the running-state control after the piston stroke amount becomes equal to or larger than a predetermined amount.

4. The device for controlling the automatic transmission according to claim 1, wherein
   the physical amount is either a time period for which a signal output from the vehicle speed detection unit continues, or the number of signals output from the vehicle speed detection unit, and
   the control unit is configured to make the determination about switching from the stopped-state control to the running-state control either after the number of signals becomes equal to or larger than a predetermined number, or after a state where a vehicle speed detected based on the number of signals is equal to or higher than a predetermined vehicle speed has lasted a second predetermined time period.

5. The device for controlling the automatic transmission according to claim 1, wherein
   the physical amount is either a hydraulic pressure supplied to the engaging elements, or an instruction hydraulic pressure therefor, and
   the control unit is configured to make the determination about switching from the stopped-state control to the running-state control after either the hydraulic pressure supplied to the engaging elements or the instruction hydraulic pressure therefor becomes equal to or higher than a predetermined hydraulic pressure.

6. A method for controlling an automatic transmission, comprising
   when a shift position has been switched from a parking position or a neutral position to a driving position, making a determination about switching from stopped-state control to running-state control based on a vehicle speed after a physical amount indicating a state of the automatic transmission becomes equal to or larger than a predetermined value, the stopped-state control being control for a hydraulic pressure supplied to engaging elements based on an input rotation frequency of the automatic transmission, and the running-state control being control for the hydraulic pressure supplied to the engaging elements without using the input rotation frequency of the automatic transmission.

7. A device for controlling an automatic transmission, comprising:

position detection means for detecting a shift position;

vehicle speed detection means for detecting a vehicle speed;

rotation frequency detection means for detecting an input rotation frequency of the automatic transmission; and control means for, when the shift position has been switched from a parking position or a neutral position to a driving position, making a determination about switching from stopped-state control to running-state control based on the vehicle speed after a physical amount indicating a state of the automatic transmission becomes equal to or larger than a predetermined value, the stopped-state control being control for a hydraulic pressure supplied to engaging elements based on the input rotation frequency of the automatic transmission, and the running-state control being control for the hydraulic pressure supplied to the engaging elements without using the input rotation frequency of the automatic transmission.

* * * * *